March 9, 1926.
A. E. GIBSON
1,575,753
METHOD AND MEANS FOR PLACING PINS IN ARTIFICIAL TEETH
Filed July 18, 1924
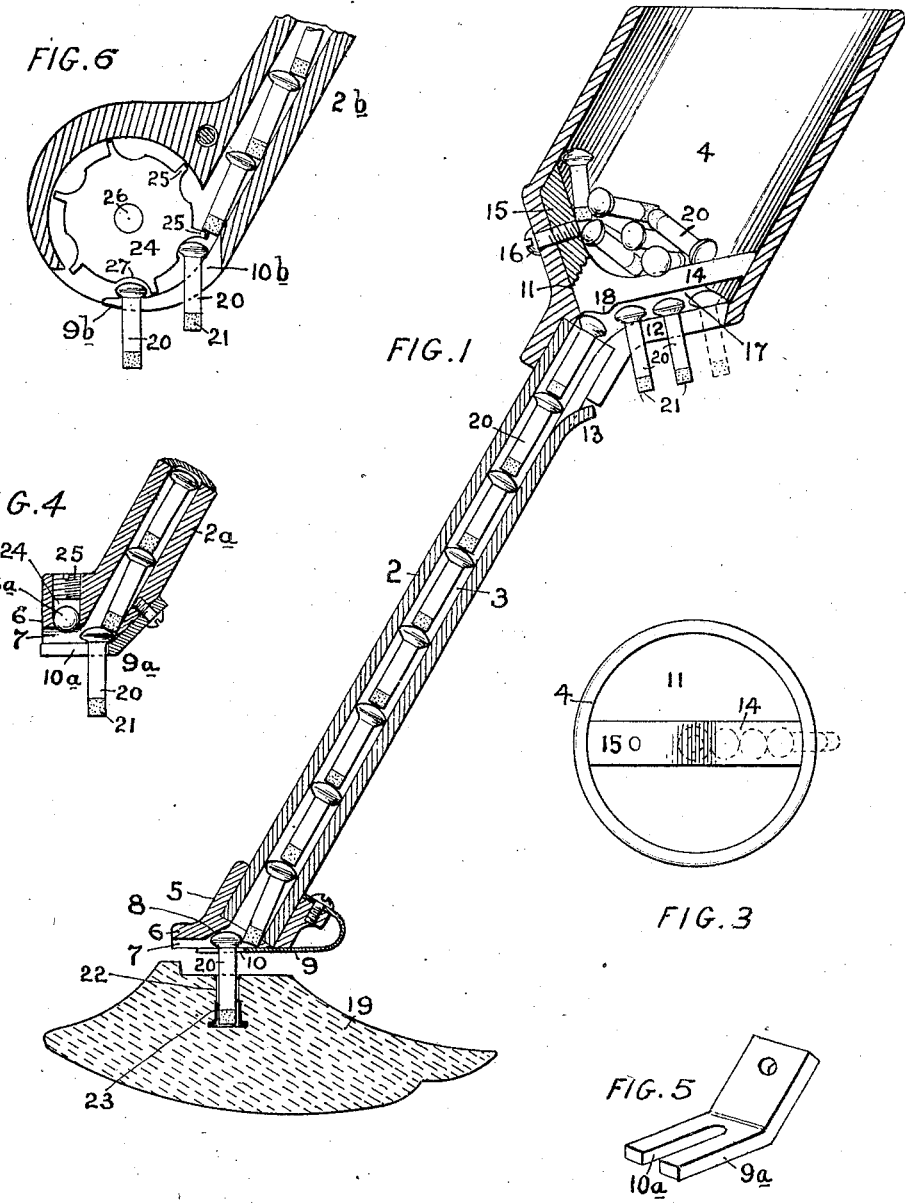
Inventor
Albert. E. Gibson
By *(signature)*
Attorney.

Patented Mar. 9, 1926.

1,575,753

UNITED STATES PATENT OFFICE.

ALBERT E. GIBSON, OF SPRINGFIELD, PENNSYLVANIA, ASSIGNOR TO THE DENTISTS' SUPPLY COMPANY, A CORPORATION OF NEW YORK.

METHOD AND MEANS FOR PLACING PINS IN ARTIFICIAL TEETH.

Application filed July 18, 1924. Serial No. 726,685.

*To all whom it may concern:*

Be it known that I, ALBERT E. GIBSON, a citizen of the United States, and resident of Springfield, county of Delaware, and State of Pennsylvania, have invented an Improvement in Methods and Means for Placing Pins in Artificial Teeth, of which the following is a specification.

In the manufacture of artificial teeth in which anchoring pins are soldered to metallic anchors embedded in the porcelain body of the tooth, it has been customary in attaching the pin to the anchor after the tooth has been vitrified to introduce a small cylinder of solder by means of a pair of pliers and thereafter insert in the hole above the solder the anchoring pin while in the custody of the pliers. After this assemblage, the tooth is subjected to sufficient temperature to fuse the solder and form a union between the pin and the anchor. In following this procedure, the manual operation is a delicate one and consumes considerable time, first, because it requires two operations, namely, the insertion of the solder and then the insertion of the pin; second, because the pliers do not always grasp the pin in the same manner and difficulty is experienced in inserting the pin because of the minuteness of the hole in the porcelain tooth body; and third, the pins and solder are lying promiscuously in separate saucers or trays and must be individually selected and picked up by the operator, which not only causes loss of time due to selection and proper grasping of the article for insertion, but is also a constant strain upon the sight.

The object of my invention is to provide a means for quickly and accurately introducing pins and solder into the artificial tooth bodies and at the same time overcome the objections above enumerated as inherent to the present method of procedure.

My invention consists broadly in a hand tool through a hollow stem of which the pins are automatically fed in succession by gravity and consecutively project from the bottom of the tool in such manner and position as to be capable of being positively inserted in the hole in the tooth and quickly disengaged from the tool, said disengagement permitting the next pin in succession to occupy the space thus released and assume a position for being introduced into the next hole of the tooth or teeth, there being usually two holes to receive pins in each tooth.

My invention further comprises the method of placing pins and the accompanying solder in the holes and anchors of artificial teeth which consists in first attaching the solder to the ends of the pins and thereafter automatically feeding a plurality of pins with the solder attached successively through a guiding aperture of a hand tool and causing the soldered end of the pin to project to a level below the tool, so that it is exposed; then inserting the solder and end of the pin in attached relation into the hole and anchor of the artificial tooth so that they are positively engaged and positioned therein; and thereafter withdrawing the tool and the remaining pins with attached solder and causing the next lowermost pin in the tubular guiding aperture to descend by gravity into position to expose its lower end with the solder attached.

My invention also comprehends details of construction which, together with the improvements above stated, are fully described hereinafter and specifically pointed out in the claims.

Referring to the drawings: Fig. 1 is a vertical section through my improved tool showing it in use in applying a pin to a tooth body; Fig. 2 is an inverted view of the lower part of the tool; Fig. 3 is a plan view of the top or hopper part of the tool; Fig. 4 is a section of the lower part of a modified construction of the tool; Fig. 5 is a perspective view of a portion of the construction of Fig. 4; and Fig. 6 is a vertical section of the lower part of another modification of my improved tool.

2 is a tubular handle or stem and is provided at the top with a hopper 4 for the pins and a positioning and releasing means for the pin at the bottom. This latter means for positioning and releasing the pin consists of a shoe 5 fitted to the lower end of the tubular stem and having a toe extension 6 grooved on its end side at 7, said groove opening inwardly into the tubular passage 3 of the tubular stem and having a depth less than the vertical thickness of the head of the pin, as will be clearly understood by reference to Fig. 1. The shoe 5 is provided with a delicate spring 9 which is formed of flat spring metal resting against the under part of the shoe and slotted, as at 10, with a width sufficient to permit the shank of the pin to freely pass. This spring 9 preferably terminates at some distance back of the toe 6. With this construction, it is evident that the lowermost pin 20 will descend so that its shank will pass downward through the opening 10 of the spring 9 into the position indicated and in which the head of the pin will be brought in contact with an oblique shoulder 8 leading from the hole 3 in the tubular stem and the groove 7 under the shoe and toe thereof. In this manner, the pin is generally held in position for ready insertion into the hole 22 and anchor 23 therein of the porcelain tooth 19, while it is lying upon the tray in front of the operator. When the pin has been inserted, a backward movement of the tool will cause the head of the pin to ride under the shoulder 8 slightly depressing the prong end of the spring 9 and releasing the head under the toe portion 6 of the shoe which will insure a final pressure to the pin just about the time it is being released. As soon as the tool has been withdrawn to fully release the pin which has been inserted in the tooth, the next lowermost pin descends and the shank thereof passes downward through the slotted end 10 of the spring 9, and in turn assumes the vertical position indicated in Fig. 1, though at that time it would not be inserted in the hole and anchor of the tooth. It will be understood that the weight of the series of pins passing down through the tubular passage 3 of the tool provides an effective propulsive effort upon the lowermost pin to project it through the slotted aperture in the spring 9 but not with sufficient power to cause the spring 9 to be depressed. The tension of spring 9 is such as will not be overcome except when the head of the pin is forcibly brought into contact with the shoulder 8 after the pin has been positioned in the hole of the tooth. In the foregoing description, I have referred to the pins 20 and more specifically to their shanks and heads, but it will be observed that in the completed pins the ends of the shanks thereof are provided with solder extensions 21, these being provided on the pins by a separate machine specially designed for assembling the pins and solder in attached relation. To the present invention, it is immaterial how this is done and it will suffice in respect to the method to be carried out that the solder and the pins are first connected in a suitable attached relation by a film of solder extending slightly over the lower end of the pin to insure a frictional union, as more fully set out in my application Serial Number 739,574 and filed September 24, 1924.

After the pin, with the solder attached, is positioned in the tooth, as in Fig. 1, the tooth and pin may be heated and the solder fused to unite the pin to the tooth through the solder and anchor.

It will, therefore, be understood that in the description in respect to the passage of the pins through the tool and their insertion into the tooth, the said solder in association with the end of the shank will be simultaneously inserted into proper position within the tooth, as clearly shown in Fig. 1. While it is thus important to be able to simultaneously handle the solder and the pin by a tool of this character, it is to be kept in mind that the invention is adapted for use in connection with the pins alone, as well as with the pins with the solder attached.

The upper end of the tubular stem 2 is provided with a container 4, in which a quantity of the pins 20 may be loosely deposited, the container provided with means for causing the pins to be automatically fed in succession to and into the passage 3 in the tubular stem 2. This means comprises a conical bottom 11 for the container, opening into the tubular stem, and a transverse V-shaped bar secured in place by a screw 16 passing through the bottom and into the part 15 thereof, the remaining part 14 of the bar arranged at a distance above the conical bottom to provide a space 17 which will permit the passage of the pins 20 and enable the shanks thereof to find their way through the slot 12 in the bottom of the container and down which they pass to the passage 3 of the stem. As the pins 20 work downward by gravity, the heads are retarded by friction and by a shoulder 17 on the lower end of the bar part 14, thereby causing the shanks to swing through slot 12 in the passage 3. The curved guide 13 will guide the lower end of the pin shank inwardly into the passage 3 as the head slips under the shoulder 18 and is released. By means of this construction, the mere shaking of the device as a whole will cause the pins to work under the bar portion 14 and into the slot 12 as shown, the bar portion 14 preventing clogging of the same. This means for feeding the pins in succession to and through the stem to the delivery end thereof is shown by way of example only and may be of any other suitable construction adapted for the purpose.

In the modifications shown in Figs. 4 and 5, the lower end of the tubular stem 2ª is enlarged into the foot portion 6 providing the grooved channel 7, as in Fig. 1, though in this case the channel is sufficiently deep for the passage of the heads of the pins 20. The under part of the shoe is fitted with a slotted plate 9ª, the slot 10ª permitting the passage of the pin shank while suspending the head thereof. 8ᵃ is a metal ball loosely fitting in a vertical chamber 24 and retained therein by a screw plug 25. The ball is suspended with its lower end projecting downward into the grooved channel to offer an abutment for the heads of the pins to prevent the pins unintentionally passing out of the tool. When the pin is inserted in the tooth body, the tool may be moved backward, in which case the head of the pin will pass through and out of the end of the groove or channel 7, lifting the ball as it passes, said ball providing a yielding shoulder instead of a rigid one, as in Fig. 1, the yielding provision being to compensate for the employment of the nonyielding slotted plate 9ᵃ instead of a yielding or spring plate shown at 9 in Fig. 1.

In the modification shown in Fig. 6, I provide the lower end of the tubular stem 2ᵇ with a head in which a feeding toothed wheel 24 is journaled at 26. The wheel is free to revolve and has its perimeter provided with teeth 25 and recessed portions 27 forward of each tooth. The bottom part of the head is curved to form a shoe 9ᵇ which is slotted at 10ᵇ for permitting passage of the shanks of the pins 20. As the lowermost pin is inserted in the tooth and the tool moved backward or to the right, the head of the pin will cause the wheel 24 to be rotated, releasing the last mentioned pin and lowering the next pin. As this takes place, the lowermost pin formerly in the tubular stem 2ᵇ is lowered by the tooth 25 of the wheel 24, releasing the shank thereof to permit it to pass into and project through the slot 10ᵇ as shown. The wheel 24 being free to revolve, the act of releasing one pin brings another into position, as will be understood by referring to Fig. 6.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. A tool for inserting headed pins in holes of objects, consisting of a stem having a passage for pins extending through it and to the bottom thereof, means at the extreme bottom of the stem for holding the head of the pin while permitting its shank to project downward from below the stem so as to be exposed, and means for guiding the pin with its shank exposed in an approximately horizontal direction to release it from the holding means.

2. The invention according to claim 1, wherein further, the means for holding the head of the pin at the lower end of the stem comprises a laterally slotted member the slot in which has a width sufficient for the pin shank to pass through but a less width than the diameter of the head and provided with a yielding obstruction to temporarily hold the pin in the slot but release it under lateral pressure.

3. A tool for inserting headed pins in holes of objects, consisting of a stem having a passage for pins extending through it and to the bottom thereof, means at the bottom of the stem for holding the head of the pin while permitting its shank to project downward, and means for guiding the pin in an approximately horizontal direction to release it from the holding means, and wherein further, the means for holding the head of the pin comprises a spring having an open end slot of a width sufficient to permit the shank of the pin to pass freely through and out of its open end, and a guide above the spring in alinement with the slot and along which the head of the pin is guided as the shank thereof is passing through the slot in the spring.

4. A tool for inserting headed pins in holes of objects, consisting of a stem adapted to be held by the fingers provided with a passage way along its length through which the pins are guided in succession, means at the bottom of the stem for supporting the head of the pin while permitting its shank to project downwardly, and means for yieldingly holding the pin against disengagement but permitting disengagement of the stem and its associated means by moving the same away from the pin after it is frictionally engaged in the article.

5. The invention according to claim 4, wherein further, the stem is provided at its upper part with a container for loose pins and having communication with the guiding passage for delivering pins in succession thereto, said container having an inclined slotted portion through which the shanks of the pins extend in a side by side alinement before passing into the guiding passage along the length of the same.

6. The herein described method of applying pins to the holes in artificial teeth, which consists in automatically feeding pins in succession, utilizing their combined weight to cause them to travel in contact through a guiding means and the shank of the lowermost pin to be projected while sustained by its head so that its shank is unobstructed for manual insertion into the hole of the tooth, inserting the exposed shank into the hole of the tooth, and moving the guiding means and the series of pins therein horizontally away from the pin inserted into the tooth whereby said pin is released from the series and left in the tooth and the next lowermost pin is moved forward into the position formerly occupied by the released pin whereby repetition of the operation may be performed.

7. The method specified in claim 6, wherein further, as a preliminary step to the method the pins are first provided on their ends most distant from their heads with attached solder so that said solder constitutes an extension of the shank and is simultaneously fed and guided into position within the tooth by the pin, and subsequently heating the tooth, pin and solder to secure the pin in position by the fusion of the solder.

In testimony of which invention, I hereunto set my hand.

ALBERT E. GIBSON.